Patented Dec. 5, 1922.

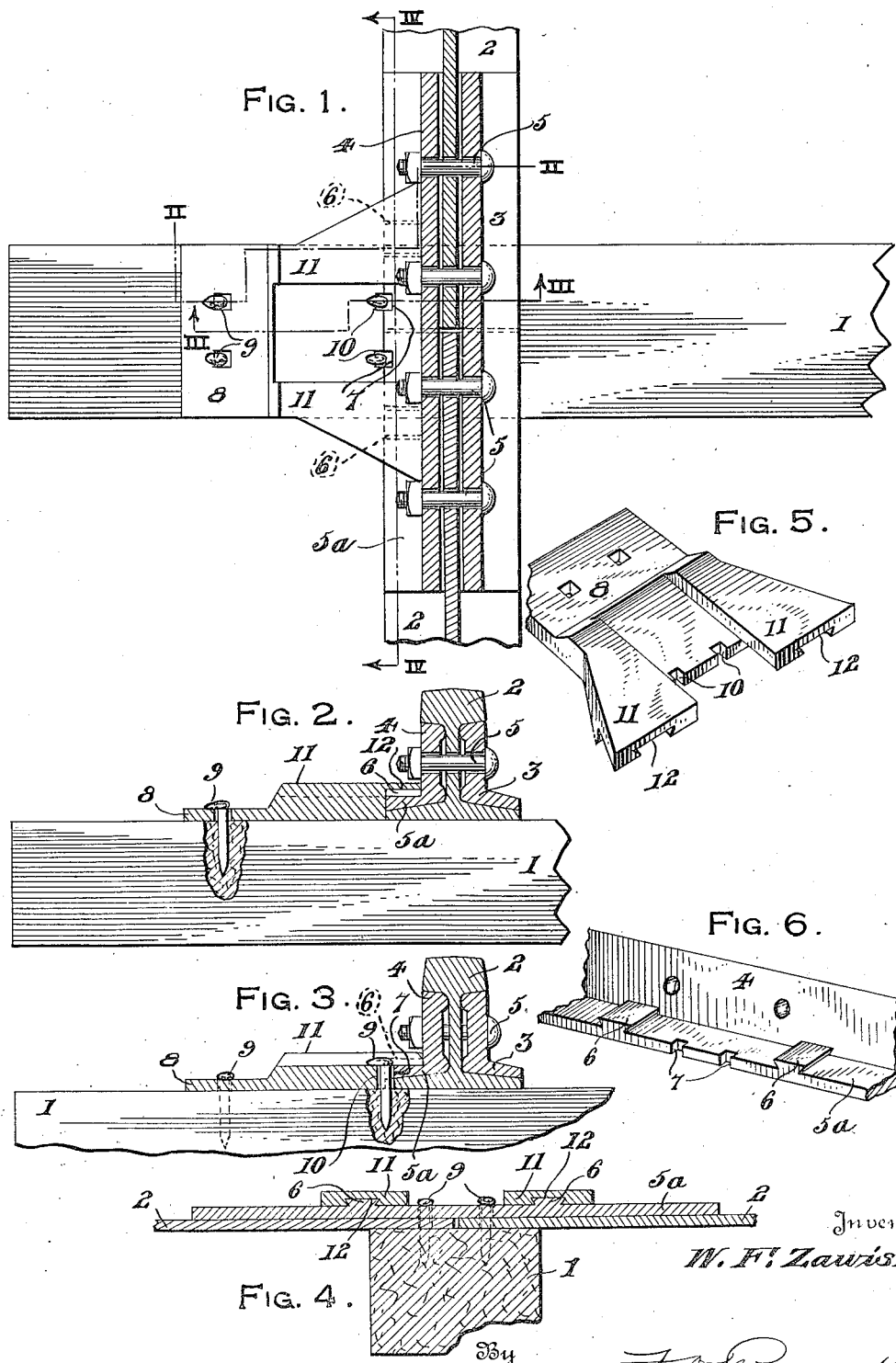

1,438,079

UNITED STATES PATENT OFFICE.

WALENTY F. ZAWISZA, OF NANTICOKE, PENNSYLVANIA.

RAIL JOINT.

Application filed September 21, 1922. Serial No. 589,614.

*To all whom it may concern:*

Be it known that I, WALENTY F. ZAWISZA, a citizen of the United States of America, residing at Nanticoke, in the county of Luzerne and State of Pennsylvania, have invented certain new and useful Improvements in Rail Joints, of which the following is a specification.

This invention relates to certain new and useful improvements in rail joints and has particular reference to the manner of securing and anchoring a fish plate to the meeting ends of rails to prevent longitudinal creeping movements thereof on a supporting tie.

The primary object of the invention resides in the provision of a rail joint wherein a fish plate is bolted to the meeting ends of rails while a clamping plate anchored to the tie has interlocking connections with the fish plate for holding the same immovable relative to the supporting tie.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a fragmentary top plan view, partly in section showing a rail tie with meeting rail ends supported thereon and anchored in position, Figure 2 is a detail sectional view taken on line II—II of Fig. 1 showing the clamping plate anchored to the supporting tie and interlocked with the adjacent fish plate, Figure 3 is a detail sectional view taken on line III—III of Fig. 1 showing the registering notches in the fish plate and clamping plate for receiving the anchoring bolts, Figure 4 is a detail sectional view taken on line IV—IV of Fig. 1 showing the dove-tailed interlocking connection between the fish plate and clamping plate, Figure 5 is a fragmentary perspective view of the clamping plate, and Figure 6 is a fragmentary perspective view of the fish plate associated with the clamping plate and showing the dove-tailed-shaped lugs carried by the base flange thereof.

Referring more in detail to the accompanying drawing, there is illustrated a supporting tie 1 having meeting rail ends 2 mounted thereon, a fish plate 3 positioned at one side thereof, while a fish plate 4 is positioned at the opposite side, the two fish plates being anchored to the webs of the meeting rail ends by bolts 5 passing through registering openings formed therein.

The fish plate 5 is shown in detail in Fig. 6, the same embodying a base flange 5ª engaging the base flanges of the meeting rail ends as illustrated, the base flange of the fish plate 5 being provided with a pair of spaced upwardly extending dove-tailed-shaped lugs 6 and intermediate notches 7 at the free edge of the base flange 5ª.

A clamping plate 8, preferably rectangular in plan view is anchored by spikes 9 to the supporting tie 1 for association with the fish plate 5, the forward edge of the clamping plate 8 being provided with spaced notches 10 that register with the notches 7 formed in the free edge of the base flange 5ª of said fish plate, and through which registering notches anchoring spikes 9 are driven for entering the tie as shown in Fig. 3. Each forward corner edge of the clamping plate 8 carries an upwardly positioned leg projection 11 having dove-tail-shaped grooves 12 formed in the lower face thereof to receive the lugs 6 formed upon the fish plate 5, the interlocking connection between the clamping and fish plates preventing movements thereof relative to the supporting tie and the meeting rail ends.

From the above detailed description of the device, it is believed that the construction and operation thereof will at once be apparent, and while there is herein shown and described the preferred embodiment of the invention, it is nevertheless to be understood that minor changes may be made therein without departing from the spirit and scope thereof as claimed.

What is claimed as new is:—

1. In a rail joint of the type described, a supporting tie, meeting rail ends mounted thereon, a fish plate secured to each side of the rail ends, one of said fish plates having dove-tail-shaped lugs carried by the base flange thereof, a clamping plate anchored to the supporting tie and spaced forwardly extending legs carried by the clamping plate having dove-tail-shaped grooves in the lower faces thereof for receiving the lugs upon the adjacent fish plate.

2. In a rail joint of the type described, a supporting tie, meeting rail ends mounted thereon, a fish plate secured to each side of the rail ends, one of said fish plates having dove-tail-shaped lugs carried by the base flange thereof, a clamping plate anchored to the supporting tie and spaced forwardly extending legs carried by the clamping plate having dove-tail-shaped grooves in the lower faces thereof for receiving the lugs upon the adjacent fish plate, the adjacent edges of the fish plate and clamping plate having registering notches therein for the reception of anchoring spikes.

In testimony whereof I affix my signature.

WALENTY F. ZAWISZA.